US006457088B1

(12) United States Patent
Lauer (10) Patent No.: US 6,457,088 B1
(45) Date of Patent: Sep. 24, 2002

(54) METHOD AND APPARATUS FOR PROGRAMMING AN AMPLIFIER

(75) Inventor: Peter Lauer, Loveland, OH (US)

(73) Assignee: Vickers, Inc., Maumee, OH (US)

( * ) Notice: Subject to any disclaimer, the term of this patent is extended or adjusted under 35 U.S.C. 154(b) by 0 days.

(21) Appl. No.: 09/357,486

(22) Filed: Jul. 20, 1999

(51) Int. Cl.$^7$ .......................... G06F 13/00; G06F 13/38; G06F 13/40

(52) U.S. Cl. ...................................... 710/306; 713/300

(58) Field of Search ................................ 710/305–315; 713/300–340

(56) References Cited

U.S. PATENT DOCUMENTS

| | | | |
|---|---|---|---|
| 3,939,329 A | | 2/1976 | Doran .......................... 700/11 |
| 4,086,804 A | | 5/1978 | Ruby ........................... 73/1.64 |
| 4,134,423 A | | 1/1979 | Mayer .......................... 137/486 |
| 4,282,467 A | * | 8/1981 | Gruesbeck ................... 318/561 |
| 4,287,763 A | * | 9/1981 | Richard .................... 73/170.29 |

(List continued on next page.)

OTHER PUBLICATIONS

Korane, Kenneth J., "Mobile Machines GetCAN in Gear", (KVASER CAN pages—Machine Design): pp. 1–6, © 1998, obtained from website: http://www.kvaser.se/can/info/litratur/machdes.htm ; (This article is reprinted with permission by Penton Publisshing Inc. The article's text is reprinted as it appeared in the Sep. 12, 1996 Issue of *Machine Design*. © Copyright 1996, 1997, Penton Publishing Inc.).

Mostowfi, Darius., "Digital Signal Processing with the PIC16C74", © 1997 *Microchip Technology, Inc.*, DS00616A–pp. 1–33.

Sauer–Sundstrand Company Brochure—IHC Integrated Hydrostatic Control, BLN–95–9056, pp. 1–2, Issue: Jan. 1997, ©1997.

*Primary Examiner*—Rupal Dharia
(74) *Attorney, Agent, or Firm*—Dinsmore & Shohl LLP (57) ABSTRACT

An method and apparatus for programming the parameters of an adjustable or programmable device such as a valve amplifier, wherein the adapter disconnects an input on the amplifier from a valve controller and reconnects the input to a programming apparatus, such as a microcontroller or a computer for example, to modify the amplifier parameters. Accordingly, the valve amplifier need not include a separate connection for connecting to a programming apparatus, thereby decreasing its cost and the risk of contamination. A first connector on the adapter is adapted to mate with a connector to a controller, a power supply, and a controlled mechanism, such as a valve. A second connector on the adapter is adapted to mate with a connector on the amplifier. A third connector on the adapter can mate with a serial computer connector, and a computer can program the parameters. Alternatively, the adapter can include a microcontroller to conduct the programming of the amplifier parameters. Input keys, indicators, and a display can be provided on the adapter to work in conjunction with the microcontroller in conducting the programming. A switch on the adapter can switch between a run mode, wherein the amplifier input is connected to the valve controller for normal control of the valve, to a program mode, wherein the amplifier input is connected to the programming apparatus for modifying of the amplifier parameters. The amplifier is programmed to detect when the adapter is in programming mode. For example, the adapter can reduce the amplitude of the power supplied to the amplifier, and the amplifier can detect this reduced power signal and prepare to communicate with the programming apparatus. To achieve this power signal reduction, the switch on the adapter, when switched to program mode, connects the power signal to power reduction circuitry which feeds a reduced power signal to the amplifier.

18 Claims, 6 Drawing Sheets

U.S. PATENT DOCUMENTS

| | | | |
|---|---|---|---|
| 4,292,460 A | * | 9/1981 | Frolov et al. ................ 373/100 |
| 4,422,475 A | | 12/1983 | Aspinwall .............. 737/630.15 |
| 4,493,362 A | | 1/1985 | Moore et al. ............... 164/457 |
| 4,570,215 A | | 2/1986 | Miura et al. .................. 700/11 |
| 4,573,114 A | | 2/1986 | Ferguson et al. .............. 700/9 |
| 4,628,442 A | | 12/1986 | Isobe et al. ................... 700/84 |
| 4,700,304 A | * | 10/1987 | Byrne et al. ........... 303/122.05 |
| 4,790,233 A | | 12/1988 | Backe et al. .................. 91/361 |
| 4,816,987 A | | 3/1989 | Brooks et al. ................ 700/45 |
| 4,854,346 A | | 8/1989 | Nakanishi et al. ..... 137/624.11 |
| 4,980,825 A | | 12/1990 | Tootell et al. ................ 702/83 |
| 5,022,406 A | * | 6/1991 | Tomlinson .................. 600/532 |
| 5,172,311 A | | 12/1992 | Reinhart et al. ............... 700/11 |
| 5,174,495 A | | 12/1992 | Eichholz et al. ......... 230/12.12 |
| 5,242,149 A | | 9/1993 | Sikkema ................ 251/129.07 |
| 5,294,089 A | | 3/1994 | LaMarca .................. 251/30.02 |
| 5,385,171 A | | 1/1995 | Cleasby ................. 137/625.64 |
| 5,638,863 A | | 6/1997 | Whang et al. ......... 137/624.11 |
| 5,748,466 A | | 5/1998 | McGivern et al. ............ 700/17 |
| 5,778,932 A | | 7/1998 | Alexander ............. 137/625.65 |
| 5,880,957 A | | 3/1999 | Aardema et al. ............. 700/86 |

* cited by examiner

METHOD AND APPARATUS FOR PROGRAMMING AN AMPLIFIER

TECHNICAL FIELD

The present invention relates generally to adjustable devices, such as amplifiers for example, which convert a command signal to an appropriate control signal in order to control a mechanism according to parameters stored in the amplifier. More specifically, the present invention relates to a method and apparatus for modifying parameters of a valve amplifier such that it achieves the desired command-signal-to-control-signal conversion for controlling a valve.

BACKGROUND OF THE INVENTION

Proportional solenoid valves are typically controlled by a valve amplifier, wherein an input command signal from a controller causes magnetically actuated movement of a slidable member in the valve, causing a flow path in the valve to become more open or more closed, thereby affecting fluid flow. This input command signal from the controller is usually a voltage signal between 0 and 10 volts, 0 volts corresponding to no flow and 10 volts corresponding to full flow. An example of a solenoid valve is provided in U.S. Pat. No. 5,242,149, the entire disclosure of which is hereby incorporated herein by reference.

However, a solenoid valve cannot respond directly to this voltage command, because each valve requires an electrical current which is between its minimum electrical current value (e.g., no flow) and its maximum electrical current value (e.g., maximum flow). Thus, in order for the valve to operate, a conversion device, such as an amplifier for example, is required to convert the voltage command signal from the controller to the appropriate electrical current control signal for the valve. For example, a voltage command signal which represents 50% flow (e.g., a 5 volt command signal) needs to be converted to the appropriate electrical current by the valve amplifier. In other words, the amplifier provides a control signal to the valve which is proportional to the input command signal. An example of such an amplifier is the PVG mobile valve amplifier, manufactured by Danfoss Fluid Power.

Valve amplifiers have also had the capability to be modified for the particular controller and valve with which they will be used. Parameters which affect the voltage-command-signal-to-electrical-current-control-signal conversion can include the ramp time, deadband, gain, maximum amplitude, and dither frequency, for example. The parameters are adjusted according to the particular valve with which the amplifier is used, and the particular application in which the valve is used.

For some amplifiers, the parameters can be adjusted by adjusting potentiometers provided in the amplifier circuitry. However, if the amplifier is digitally programmable, the amplifier can be provided with a connector, such as a serial connector, which can connect the programmable digital controller within the amplifier to a personal computer (PC) or other digital programming apparatus. Software on the PC can then adjust the parameters which affect the voltage-command-signal-to-electrical-current-control-signal conversion. Parameters can be downloaded from the PC to the amplifier, or uploaded from the amplifier to the programming apparatus and stored in a file. An example of such a programmable amplifier is described in U.S. Pat. No. 5,638,863, the entire disclosure of which is hereby incorporated herein by reference. Such an amplifier is described in the patent as including a microcomputer, a memory, and a separate interface for connecting to an external personal computer. When the computer is connected to the microcomputer through the interface, new parameters can be written to the memory of the amplifier.

Another example of a programmable or adjustable amplifier is available under the trade name EMA amplifier, which is manufactured by Vickers Incorporated for controlling the EMV-611e valve. Windows-based software can be used for setting parameters and showing amplifier status via a PC, which can be connected using a serial connector on the amplifier. The software on the PC digitally sets ramp, deadband, gain and dither, which can be saved by a filename and recalled and used for various machine types. This amplifier requires a separate interface for receiving the command signal input from a controller.

Another programmable amplifier which has been developed is described in U.S. Pat. No. 5,172,311, issued to Reinhart et al. This amplifier includes a programmable component including a read-only-memory in which the amplifier is associated to a particular type of valve by loading the read-only-memory with valve specific data which specify a valve type. The programmable component of the amplifier comprises a microprocessor, a random access memory, and a separate interface for series transfer of data to and from a computer. Data transmitted through the interface to program the amplifier is stored in the random access memory.

However, while the programmable capability of such amplifiers can be advantageous, such amplifiers require an extra connector or interface for connecting to the programming apparatus (e.g., a computer). In addition, they require various components to allow the amplifier to communicate with the programming apparatus. As can be understood, this extra hardware adds to the cost of the amplifier and its complexity, and also takes up additional space. Moreover, the additional connector can compromise the environmental seal of the amplifier, which often needs to meet demanding standards.

Accordingly, it is desirable to provide a method and apparatus for programming parameters of a programmable device without requiring the device to include a separate interface, other than the interface which is already used to receive command signals, such that cost and complexity of the device are not increased, and the environmental rating is not compromised. Moreover, it is desirable to provide a method and apparatus for programming parameters of a programmable device without the necessity of providing the device itself with the programming components, which can add to its cost and complexity. Preferably, the programmable device can comprise an amplifier, such as a valve amplifier for example, which can convert a command signal to an appropriate control signal, for control of a controllable mechanism, such as a valve for example.

SUMMARY OF THE INVENTION

It is an object of the present invention to obviate the above-described problems.

It is a further object of the present invention to provide a method and apparatus for programming a programmable or adjustable device, such as a valve amplifier for example, without the necessity of providing the device with a separate interface for connection to a programming apparatus, such as a personal computer or microcontroller for example.

Yet another object of the present invention is to provide a method and apparatus for programming a device, without the necessity of providing the device with additional programming components.

Another object of the present invention is to provide a method and apparatus for connecting a valve amplifier to a computer, or other programming apparatus, without the necessity of providing the amplifier with an additional input connector.

It is yet another object of the present invention to provide a method and apparatus for programming a valve amplifier while providing the amplifier with a good resistance to environmental contaminants.

It is a further object of the present invention to provide an apparatus for programming a valve amplifier without the necessity of a personal computer or other digital programming device and without the necessity of providing the amplifier with a separate input connector/interface.

Another object of the present invention is to provide a valve amplifier adapter which can be connected to a valve amplifier when programming of the amplifier is required, but which can be removed from the amplifier when the amplifier is to control a valve.

Yet another object of the invention is to provide a method for programming a valve amplifier which does not require the amplifier to include a separate connection for the programming apparatus.

It is another object of the present invention to provide a method for programming a valve amplifier which reduces the amount of hardware required per amplifier.

Another object of the invention is to provide an adapter which can be used for programming multiple programmable or adjustable devices, such as multiple valve amplifiers for example.

Yet another object of the present invention is to provide a programming adapter which can be used for viewing and/or editing of parameters stored on a programmable device.

To achieve the foregoing and other objectives, an adapter for programming parameters is provided, comprising a first connector, a second connector, a programming circuit, an input device, and a display device. The first connector is configured to connect to a mating connector having conductors connecting to a valve, a valve controller, and a power supply. The second connector is configured to connect to a valve amplifier, and the programming circuit is adapted to generate and send modified parameters to the valve amplifier. The input device is adapted to provide inputs to the programming circuit, and the display is in communication with the programming circuit and adapted to display data from the programming circuit.

According to another aspect, a system for selectively programming an adjustable device is provided, comprising an adjustable device having a command signal connector adapted to receive a command signal from a controller, and a memory unit containing stored data. The system also includes a programming apparatus adapted to provide a programming instruction, and an adapter connecting the programming apparatus to the command signal connector of the adjustable device. The adjustable device is adapted recognize the difference between a programming instruction and a command signal, and to allow modification of the stored data only in response to the programming instruction.

In another aspect, a method of programming an adjustable device is provided. The adjustable device has a command signal input adapted to receive a command signal from a controller. The method comprises the steps of providing a command signal from a controller to a command signal input of an adjustable device, and disconnecting the command signal from the command signal input. The method also comprises the steps of detecting a programming mode, connecting a programming apparatus to the command signal input, and transmitting a programming command from the programming apparatus to the command signal input. In addition, the method comprises storing data in the adjustable device, after detecting the programming mode and transmitting the programming command.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF THE PREFERRED EMBODIMENTS

Figure 1:
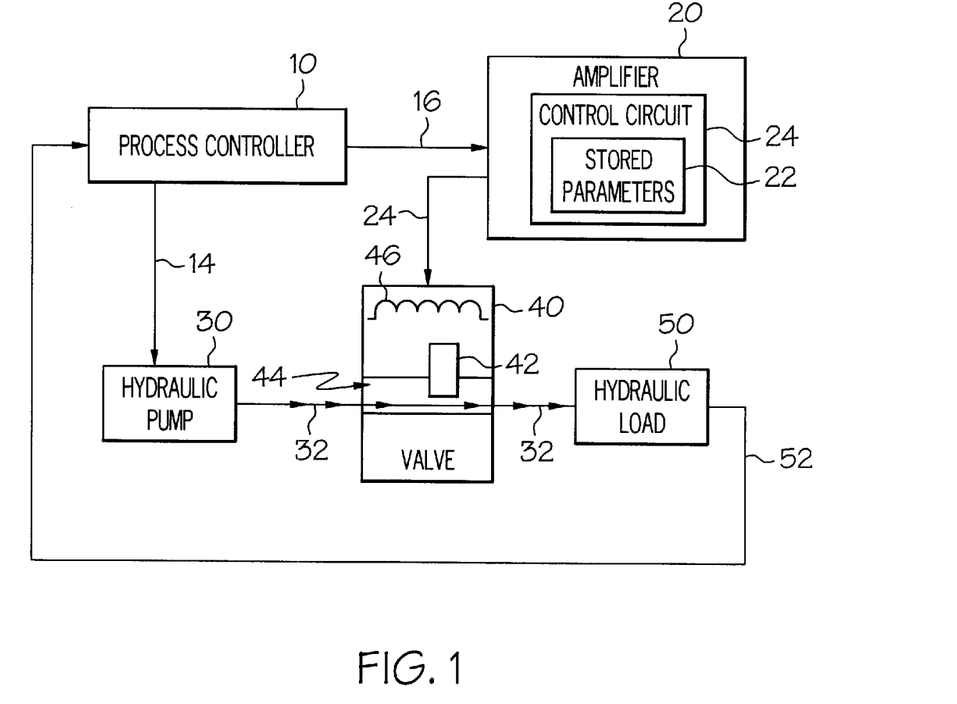
FIG. 1 is a block diagram illustrating an exemplary system including a valve which is controlled by a programmable valve amplifier, which can be programmed using the method and apparatus of the present invention.

Turning now to the drawings in detail, wherein like numbers illustrate corresponding structure, FIG. 1 is a block diagram illustrating a system including a valve which is controlled by a programmable valve amplifier. The amplifier can be programmed using the method and apparatus of the present invention. In this exemplary application for the present invention, a process controller 10 provides command signals (14 and 16) to a hydraulic pump 30 and to a valve amplifier 20. The command signal 14 to the pump 30 controls the flow of hydraulic fluid 32 from the pump, and the command signal 16 to the amplifier 20 controls (indirectly) the opening and closing of a flow path 44 within a valve 40 which is in fluid communication with the pump 20. Accordingly, the process controller 10 can control the flow of the hydraulic fluid 32 provided to a hydraulic load 50.

Feedback signals 52 from the load 50 are fed to the controller 10 for monitoring the load and adjusting the command signals 14 and 16 according to a control program within the process controller. For example, one or more physical measurements (such as flow volume, temperature, pressure, and the like) can be made by appropriate sensors and fed to the controller 10 where they are compared with respective set points to generate the command signals 14 and 16. As is known in the art, the controller 10 can include a central processing unit (CPU) and a nonvolatile memory unit which includes a control program for generating the command signals 14 and 16 based upon the feedback signals 52. In addition, the process controller 10 can include an input mechanism and a display for changing process setpoints and monitoring the control process.

The amplifier 20 receives the command signal 16 and converts it to an appropriate control signal 24 for control of the valve 40. Preferably, the command signal 16 is an analog voltage signal which indicates the desired degree of opening of the valve flow chamber 44. For example, the command signal 16 from the process controller 10 can be a voltage signal between 0 and 10 volts, 0 volts corresponding to no flow and 10 volts corresponding to full flow. The flow chamber cross section is adjusted according to this voltage command signal.

The valve 40 includes a movable member 42, the position of which controls the degree of opening of the flow chamber 44. For example, the member 42 could comprise a solenoid pin which is moved by a solenoid 46 which is appropriately mounted in the valve 40, and which includes an electrical coil responsive to the electrical control signal 24 for applying a variable force on the pin. A potential configuration for the solenoid valve 40 is described in U.S. patent application Ser. No. 09/005,519, the entire disclosure of which is hereby incorporated herein by reference.

In the embodiment exemplified in FIG. 1, the solenoid valve 40 requires electrical current signals within a particular range for control of the movable member 42, the minimum and maximum levels within the range defining the minimum and maximum flow of fluid through the valve. Accordingly, the command signal 16 represents the desired operating parameters (e.g. position) of the member 42 of the valve 40, and the amplifier 20 converts this desired parameter or position into the appropriate control signal 24 for obtaining the same. As noted, preferably, the command signal 16 comprises an analog voltage signal, and the control signal 24 comprises an analog current signal.

Although FIG. 1 illustrates one application for the amplifier 20 and valve 40, it is to be understood that the method and apparatus of the present invention could be utilized within other applications as well. For example, input command signals 16 could be provided to the amplifier 20 by other controllers, such as by a potentiometer, a joystick, or an electric pedal such as on a mobile machine or vehicle, or by a central processing unit in an industrial machine for example. In addition, it is contemplated that the control system for the amplifier 20 and valve 40 could be open or closed loop.

The conversion which is effected by the amplifier 20 is determined by a control circuit 24 which includes a number of stored parameters 22. In particular, the control circuit 24 can include an analog-to-digital converter (ADC) to convert the analog command signal 16 to a digital command signal, a controller for converting the digital command signal to a digital control signal according to a predetermined conversion function, and a digital-to-analog-converter (DAC) for converting the digital control signal to the corresponding analog current control signal 24. The control circuit 24 could comprise a programmed microcontroller or microprocessor. It is also contemplated that separate circuits could alternatively be provided within control circuit 24 for performing the various functions.

The stored parameters 22 determine the conversion function which is carried out by the control circuit 24. As mentioned, these parameters can include ramp time, gain, deadband compensation, dither frequency, pulse width modulation (PWM) frequency, and maximum amplitude, and they can be stored in a nonvolatile memory within the amplifier 20. In addition, the parameters 22 can be modified according to the present invention, so that the amplifier 20 can be utilized with any of a variety of valves 40, and to accommodate the particular application in which the valve will be used.

As is known in the art, the ramp time parameter 22 controls the amount of time between the receipt of the command signal 16 and the production of the control signal 24, the gain controls the proportion of the maximum amplitude which will be provided by the amplifier 20, and the deadband compensation parameter compensates for any deadband which may exist before the control signal 24 reaches an amplitude sufficient for the solenoid 46 to move the member 42.

The dither frequency and the PWM frequency control the frequency of the triangular signal or pulse signal which can be used to modulate the current control signal 24. The use of dither frequency and PWM frequency in a valve amplifier are discussed in U.S. Pat. Nos. 5,294,089 and 5,638,863.

Figure 2:
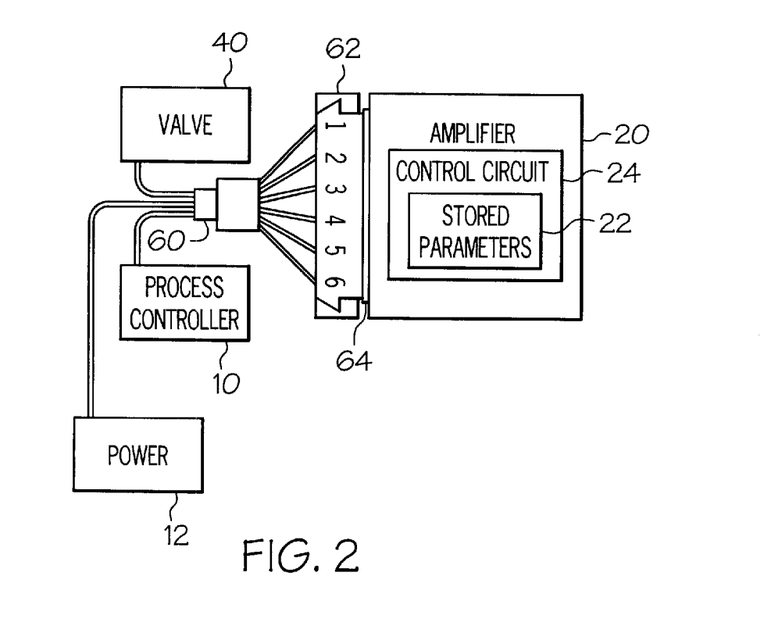
FIG. 2 illustrates an embodiment of the programmable valve amplifier of FIG. 1, and its connection to a valve, a process controller, and a power supply via a control cable.

FIG. 2 illustrates a possible embodiment of the programmable valve amplifier 20 of FIG. 1 in more detail, and its possible connections to a valve 40, a process controller 10, and a power supply 12 via a control cable 60. In the example illustrated, the cable 60 can include a pair of conductors to connect the amplifier 20 to the valve 40 (via input pins 1&2 on the amplifier), a pair of conductors to connect the amplifier to a power supply 12 (via input pins 3&4 on the amplifier), and a pair of conductors to connect the amplifier to the process controller 10 (via input pin 5 on the amplifier, which receives the command signal from the controller, and input pin 6 on the amplifier). In this embodiment, the cable 60 terminates in a 6-pin female connector 62, and the amplifier 20 is provided with a corresponding 6-pin male connector 64, with which the connector 62 can slidingly engage. However, it is to be understood that other connector types could be utilized. As an example, the female and male connectors 62 and 64 can comprise Metri-Pack 280 Series connectors, manufactured by Delphi Automotive Systems. Preferably, these connectors are of the sealed variety, so as to ensure resistance to contaminants.

In contrast to prior art methods and apparatus for programming amplifiers, the present invention does not require the amplifier 20 to have a separate connector or interface for programming the stored parameters 22 of the amplifier. Rather, an adapter is provided which allows the amplifier 20 to be programmed via the same connector on the amplifier that is ordinarily used to receive the command signal from the controller 10 (or other command signal generator). In particular, the adapter and amplifier 20 are adapted to allow the amplifier to be programmed via the same input pin on the amplifier that is ordinarily used to receive a command signal from a controller. (In the embodiments of FIGS. 2–5, the command signal input pin for the amplifier 20 is pin 5.)

In general, according to one aspect of the invention, the adapter can include a first connector to be connected to a controller, wherein the controller is adapted to provide command signals to a command signal input on the amplifier. The adapter can also include a second connector to be connected to the command signal input of the amplifier, a communication circuit adapted to communicate a programming command from a programming apparatus to the amplifier, and a switch to disconnect the command signal input from the controller and to connect the command signal input to the communication circuit. According to another aspect of the invention, even though both the programming command and the command signal are communicated to the amplifier on the same input pin, the amplifier can be programmed to recognize the difference between the two, and to allow modification of its stored parameters only in response to the programming command.

In addition, according to another aspect of the invention, a separate PC is not required to program the amplifier. Generally, this can be achieved by providing the adapter with a programming circuit or programming apparatus to generate and send modified parameters to the amplifier. The adapter can include an input device to provide inputs to the programming circuit and a display to display data from the programming circuit.

Figure 3:
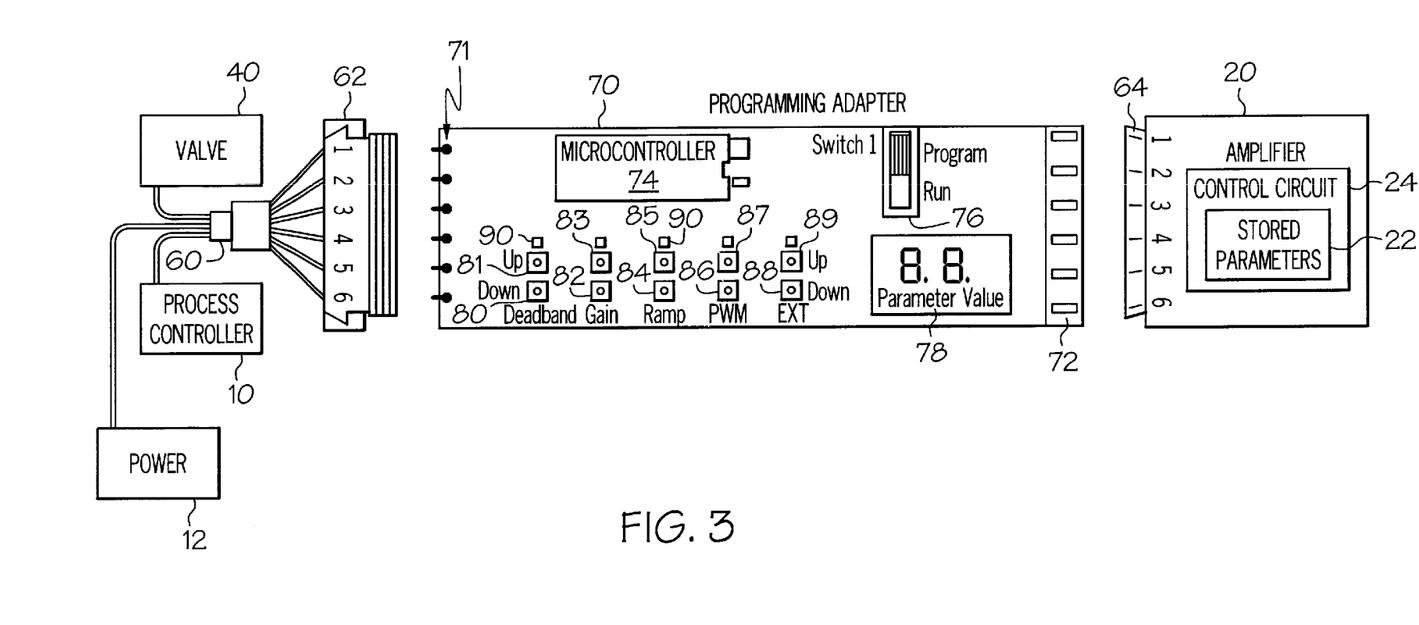
FIG. 3 illustrates an embodiment of a programming adapter for connection between the amplifier and control cable of FIG. 2 according to the present invention.

More specifically, and for the purposes of illustration, to program the amplifier 20 according to the present invention, the female connector 62 is removed from the male connector 64, and a programming adapter 70, made in accordance with the present invention, is connected therebetween, as shown in FIG. 3. The adapter 70 includes a connector 71 to mate with connector 62 of the cable 60, and a connector 72 to mate with the connector 64 of the amplifier 20.

In addition, the programming adapter 70 includes a programming apparatus, such as microcontroller 74, which is adapted to program the amplifier 20 through the command signal input pin 5 of the amplifier. Preferably, and as described in further detail with respect to FIG. 4, controller 74 is a general purpose microcontroller, such as the PIC16C74, manufactured by Microchip Technology Inc.

The programming adapter 70 also preferably includes a switch which can be placed in one of two positions. For example, the switch can comprise a mechanical switch 76 which can be moved from a first position to a second position. Placing the switch 76 into the "Run" position (or "Run" mode) connects the process controller 10 to the command signal input pin of the amplifier 20 such that voltage command signals can be fed to the amplifier. However, placing the switch 76 into the "Program" position (or "Program" mode) connects the microcontroller 74 of the programming adapter 70 to the command signal input pin of the amplifier 20, so that the microcontroller 74 can program the amplifier, such as by editing the stored parameters 22. As an alternative to the mechanical switch 76, other switches could be utilized, such as electronic switches and the like, or other switching devices adapted for on-off operation.

In addition, the adapter 70 includes input mechanisms which can provide input to the microcontroller 74 in order to instruct the microcontroller how the amplifier 20 should be programmed. For example, two push buttons can be provided for each of the stored parameters 22, such that the user can instruct an increase in the parameter value or a decrease in the parameter value. In the embodiment of FIG. 3, the deadband parameter 22 is provided with a "down" pushbutton 80, which indicates that the deadband parameter is to be decreased by a predetermined incremental amount, and an "up" pushbutton 81, which indicates that the deadband parameter is to be increased by a predetermined incremental amount. Similarly, pushbuttons 82 and 83 are provided for the gain parameter 22, pushbuttons 84 and 85 are provided for the ramp parameter 22, pushbuttons 86 and 87 are provided for the PWM parameter 22, and pushbuttons 88 and 89 are provided for the EXT parameter 22. The inclusion of the EXT pushbuttons 88 and 89 are to allow for the programming of other additional parameters at a later time. As an alternative to pushbuttons, other input mechanisms could be utilized, such as a keyboard, a touchpad, or a mouse.

The programming adapter 70 also preferably includes a display 78 which displays the value of the parameter 22 being programmed by the adapter. The display 78 can include a pair of seven segment displays, which display the value of the parameter 22 being programmed, the value displayed being incremented or decremented in response to the input mechanisms for the parameter. For example, display 78 could comprise an LN526AK display chip.

Furthermore, the programming adapter 70 preferably includes visual indicators 90 which provide an indication as to which parameter is being modified. The indicators 90 could comprise LED indicators placed in proximity to the parameter pushbuttons 80–89. When the pushbuttons for a parameter are pressed, the LED indicator 90 for that parameter illuminates, and the stored value 22 of that parameter is displayed on the display 78. Adjustments to the stored value 22 can then be made by using the up and down pushbuttons (80–89) for the particular parameter. Other indicators could alternatively be utilized, such as audible indicators, or graphical user interfaces.

Figure 4:
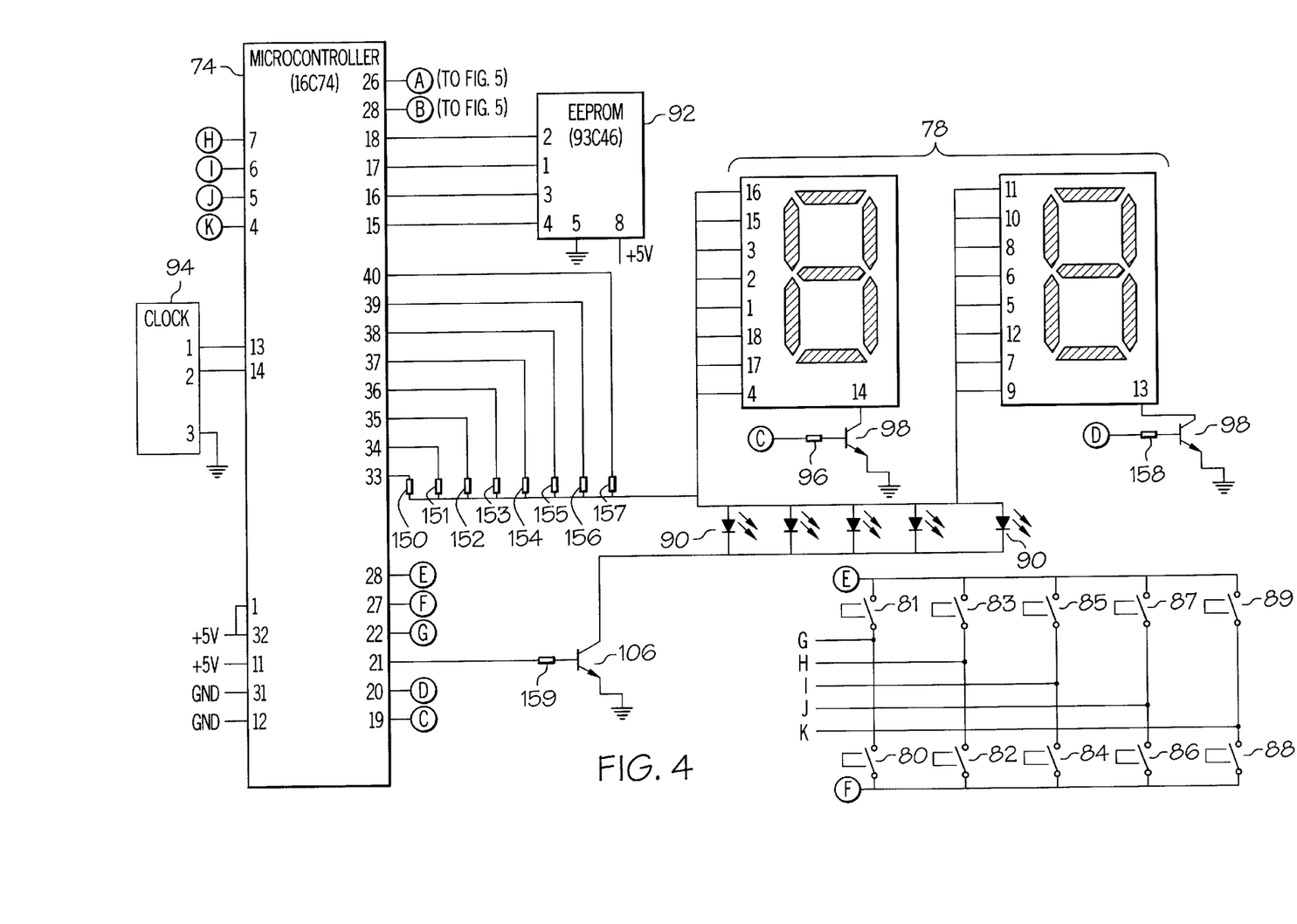
FIG. 4 is a circuit diagram including possible programming circuitry for the programming adapter of FIG. 3.

FIG. 4 is a circuit diagram including exemplary programming circuitry of the adapter 70 of FIG. 3. Generally, the circuit can include a microcontroller 74, a display 78, input buttons 81, 82, 83, 84, 85, 86, 87, 88, and 89, indicators 90, a clock 94, and a nonvolatile memory unit 92.

For the purposes of illustration and example, the embodiment shown in FIG. 4 will be described in more detail. In particular, microcontroller 74 can comprise a PIC16C74 microcontroller, manufactured by Microchip Technology Inc. The clock or oscillator 94 can connect to pins 13 and 14 of the microcontroller 74, and can comprise a 10 MHz resonator, such as a CST series resonator manufactured by MuRata Electronics Inc. Pins 1 and 2 of the clock 94 can connect to pins 13 and 14 of the microcontroller 74, respectively, and pin 3 of the clock 94 can connect to ground. A 5 volt power supply can connect to pins 1, 32, and 11 of the microcontroller 74, and pins 31 and 12 can connect to ground.

The nonvolatile memory 92 can connect to pins 15, 16, 17, and 18 of microcontroller 74. As an example, nonvolatile memory 92 can comprise an Electrically Erasable Programmable Read Only Memory (EEPROM), such as the 93C46B, manufactured by Microchip Technology Inc, in which case pins 1, 2, 3, and 4 of the memory unit 92 connect to the microcontroller 74, pin 5 connects to ground, and pin 8 connects to a 5 volt power supply.

Figure 5:
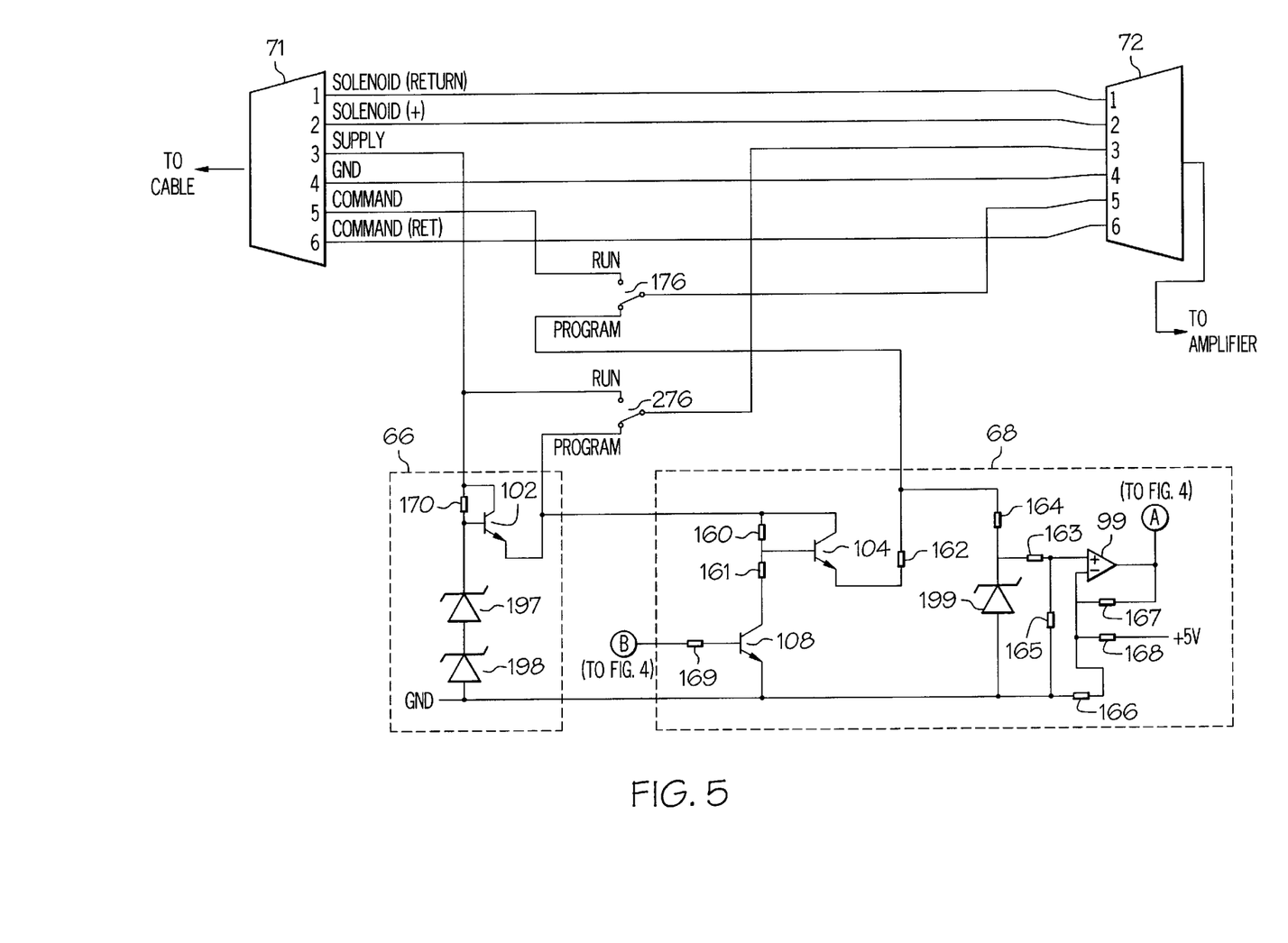
FIG. 5 is a circuit diagram including possible switching circuitry for the adapter of FIG. 3, for connection to the programming circuitry of FIG. 4, and for allowing the adapter to switch between a program mode (in which the programming circuitry is connected to the command signal input of the amplifier) to a run mode (in which the command signal of the process controller is connected to the command input of the amplifier)

In addition, microcontroller 74 can connect to the display 78 via pins 33, 34, 35, 36, 37, 38, 39, and 40, through resistors 150, 151, 152, 153, 154, 155, 156, and 157. Preferably, display 78 comprises an LN526AK display, which includes a pair of seven-segment displays, and the resistors 150–157 connect to one of the seven-segment displays at pins 1, 2, 3, 4, 15, 16, 17, and 18, and to the other of the seven-segment displays at pins 5, 6, 7, 8, 9, 10, 11, and 12, as shown in FIG. 5. It is also preferred that the collector of one of the two transistors 98 be connected to the display 78 at pin 13, and that the collector of the other of the two transistors 98 connect to the display 78 at pin 14. As an example, transistors 98 could comprise a BC817 NPN transistor, manufactured by Diodes, Inc. The base of one transistor 98 can connect to pin 19 of microcontroller through a resistor 96, and the base of the other transistor 98 can connect to pin 20 of the microcontroller 74 through a transistor 158, as shown in FIG. 4. The collector of each of these transistors 98 can connect to ground.

Moreover, the microcontroller 74 can connect to a series of input keys 80–89, which allow two input pins on the microcontroller to be connected when depressed. In particular, and as shown in the embodiment of FIG. 4, button 80 can connect across pins 27 and 22 of microcontroller 74, button 81 can connect across pins 28 and 22, button 82 can connect across pins 7 and 27, button 83 can connect across pins 28 and 7, button 84 can connect across pins 6 and 27, button 85 can connect across pins 28 and 6, button 86 can connect across pins 5 and 27, button 87 can connect across pins 28 and 5, button 88 can connect across pins 4 and 27, and button 89 can connect across pins 28 and 4. As will be understood, in this way, the pressing of any of the buttons 80–89 provides a unique input to the microcontroller 74 by connecting a unique combination of pins on the microcontroller.

Moreover, a series of indicators 90 can be connected to the microcontroller 74 and the display 78. Each indicator 90 can comprise a light emitting diode (LED), such as an SOT23 LED for example. As shown in FIG. 4, one end of the LED's can connect to pin 21 through the collector and base of transistor 106 and through resistor 159. The opposite ends can connect to pins 33–40 of the microcontroller (through the resistors 150–157) and to pins 1–12 and 15–18 of the display 78. The emitter of transistor 106 can connect to ground.

FIG. 5 is a circuit diagram illustrating one preferred example of switching circuitry for inclusion in the adapter 70 of FIG. 3 and for connection to the programming circuitry of FIG. 4. Any switching circuitry or other arrangement which allows the adapter 70 of FIG. 3 to switch from a programming mode (in which the programming circuitry of FIG. 4 is connected to the command signal input of the amplifier 20) to a normal mode (in which the command signal of the process controller 10 is connected to the command signal input of the amplifier) could equally be implemented. As shown in FIG. 5, the switching circuitry can connect to pin 26 of microcontroller 74 of FIG. 4 at node A, and to pin 28 of the microcontroller at node B.

In the embodiment of FIG. 5, the switching circuitry includes a pair of switches 176 and 276, which can be manually or automatically moved from the "Run" position to the "Program" position. Preferably, these switches 176 and 276 are simultaneously moved by actuating a single mechanical lever or element, such as the switch 76 of FIG. 3. As can be seen from the embodiment of FIG. 5, when the switch 176 is in the "Run" position, pin 5 (which receives the command signal from the controller 10) of the connector 71 is directly connected to pin 5 (which connects to the command signal input pin of the amplifier) of the connector 72. Accordingly, when the switch 176 is in the "Run" position, the command signal from the controller 10 is fed directly to the amplifier.

However, when the switch 176 is in the "Program" mode, and as can be seen in FIG. 5, pin 5 of connector 72 is connected to the programming circuitry of FIG. 4 at nodes A and B. In particular, pin 5 of connector 72 is connected through resistor 162, through the collector and base of the transistor 104, through resistor 161, through collector and base of transistor 108, through resistor 169, and, finally, to pin 28 of microcontroller 74 of FIG. 4. Moreover, pin 5 of connector 72 is also connected through two resistors 164 and 163 and operational amplifier 99 to pin 26 of microcontroller 74. In this way, the command signal input pin of the amplifier 20 is in communication with the microcontroller 74. Accordingly, the amplifier 20 can transmit signals to the microcontroller 74 as well as receive signals from the microcontroller over the input pin on the amplifier which is normally used for receiving the command signal from a valve controller. Pin 28 of microcontroller 74 can be used to send programming commands to the amplifier and pin 26 of the microcontroller can be used to receive the stored parameters 22 from the amplifier 20.

Once the amplifier 20 is connected to the microcontroller 74 through switch 176, it is believed desirable to indicate to the amplifier that the adapter 70 is in programming mode, so that the amplifier does not misinterpret a programming command from the microcontroller 74 to be a command signal from the process controller 10. As shown in the embodiment of FIG. 5, one way to achieve this is to provide a second switch 276 to the supply voltage pin 3 of the connector 71. When the switch 276 is in the "Run" position, pin 3 of the connector 72 is connected directly to the supply voltage from the cable 60 and connector 71. However, when the switch 276 is in the "Program" mode, the supply voltage from the cable 60 and connector 71 is diverted through power reduction circuitry 66. In particular, the supply voltage is connected to a resistor 170 and to the collector of a transistor 102, the emitter of which connects to the "Program" side of the switch 276.

Accordingly, the amplitude of the power signal fed to the amplifier 20 through the connector 72 is reduced by the circuitry 66 of the adapter 70, creating a "brown out" condition. However, even though the power signal is lower than that used for normal operation, the power signal is still high enough for the controller 24 of the amplifier 20 to operate. For example, lowering the power signal to between about 8 and about 18 volts can still allow the amplifier control circuit 24 as illustrated to operate.

The amplifier 20 can be provided with a program in its control circuitry 24, or other detection circuitry, which is adapted to detect the lowered power signal. When the lowered supply voltage is detected by the circuit 24, the amplifier 20 can shut down operation of the valve to which it is connected, and prepare to receive a programming command from the microcontroller 74. In this way, the amplifier 20 will not misinterpret programming commands from the adapter 70, which are received in the amplifier at the command signal input pin 5, as command signals from the process controller 10, which are also received in the amplifier at the command signal input pin 5 during normal operation or "Run" mode.

It is contemplated that alternative programming mode signal generators adapted to signal to the amplifier 20 that the adapter 70 is in programming mode can be utilized. For example, a separate programming mode signal could be provided to the amplifier 20 to provide the programming mode indication. As another alternative, the amplifier 20 could convert to "programming" mode whenever it detects a disconnection of power. Then, it can revert to "run" mode when a reset button is depressed. As another alternative, the power supply to the amplifier 20 could be automatically lowered by connection of the adapter 70, thereby providing the programming mode signal to the amplifier 20.

Moreover, the commands and data exchanged between the adapter 70 and the amplifier 20 could be provided with error correction information, such as parity bits for example, to further ensure that command signals are not misinterpreted by the amplifier 20 as digital programming commands. As another example, cyclic redundancy check (CRC) data could be provided as well.

The embodiment of the circuit of FIG. 5 will now be described in more detail, for the purposes of illustration. Generally, a preferred arrangement might include voltage reduction circuitry 66 and communication circuitry 68. The voltage reduction circuitry 66 lowers the supply voltage to the "brown out" level, for detection by the amplifier 20. The communication circuitry 68 converts the programming signals from the microcontroller 74, which are preferably at TTL levels ("transistor-transistor logic" levels) to a protocol or format which can be understood by the amplifier 20. Similarly, the circuitry 68 converts the amplifier signals to a format which the microcontroller 74 can interpret.

More specifically, as shown in FIG. 5, the switch 176 connects through two resistors 162 and 163 to the positive input of operational amplifier 99, the output pin of the operational amplifier connecting to pin 26 of the microcontroller 74. Between the two resistors 164 and 163, a diode 199 is connected to ground. Another resistor 165 is connected off of the positive input pin of the operational amplifier 99 to ground. The negative input pin of the operational amplifier 99 connects through a first resistor 166 to ground, through a second resistor 167 to the output pin, and through a third resistor 168 to a 5 volt power supply. As an example, operational amplifier 99 can comprise an LM358 1 MHz operational amplifier manufactured by Harris Semiconductor.

The switch 176 also connects through a resistor 162 to the collector of transistor 104. The base of transistor 104 connects through a resistor 161 to the collector of transistor 108, the base of which is connected through resistor 169 to the pin 28 of the microcontroller 74. The base of transistor 104 also connects through resistor 160 to the "Program" side of the switch 276 and to the emitter of the transistor 102. The collector of the transistor 102 can connect to the "Run" side of the switch 276 and to the power supply pin 3 of the connector 71. Moreover, a resistor 170 can connect between the base and collector of the transistor 102, and a pair of diodes 197 and 198 can connect from the base of the transistor 102 to ground.

As an example, transistor 108 can comprise a BC817 NPN transistor and transistor 104 can comprise a BC807 PNP transistor, manufactured by Diodes Inc. Transistor 102 can comprise a BD139 NPN transistor.

To summarize the operation of the adapter embodiment shown in FIGS. 3–5, when the switches 176 and 276 are in the "Run" position, the adapter 70 connects the power supply pin of the amplifier 20 directly to the power supply signal from the cable 60, and the adapter also connects the command signal input pin of the amplifier 20 directly to the command signal from the process controller 10. However, when the switches 176 and 276 are switched to the "Program" mode, preferably simultaneously, the adapter 70 lowers the power supply signal fed to the amplifier 20, and also connects the command signal input pin 5 on the amplifier 20 to the programming circuit in the adapter, an embodiment of which is shown in FIG. 4. The amplifier 20 is programmed to detect the lowered power supply and, in response to this "programming mode signal", enable receipt of commands from the programming circuit and download parameters to the programming circuit.

For example, pressing button 81 could cause the microcontroller 74 to send a programming command out of pin 28, which instructs the amplifier 20, via its command signal input pin 5, to download the "deadband" parameter. The control circuitry 24 of the amplifier 20 would receive this command and send the "deadband" parameter over its command signal input pin 5, which could be amplified by operational amplifier 99 and sent to the microcontroller 74 via its pin 26. The microcontroller 74 could then display the parameter on the display 78. The communication circuitry 68 of FIG. 5 converts the signals from the amplifier 20 to a format which can be processed by the microcontroller 74, and vice versa.

Pressing the button 81 a second time could then indicate to the microcontroller 74 to raise the value of the "deadband" parameter by a predetermined incremental amount. The microcontroller 74 could perform this addition calculation, and send the revised parameter to the display 78 and also out pin 28 to the amplifier 20 (via the circuitry of FIG. 5). The amplifier 20 would receive the new parameter via its command signal input pin, and the control circuitry 24 could store it in memory 22. As an example, the control circuitry 24 of the amplifier 20 could include a microcontroller, such as the 16C71 model from Microchip Technology Inc.

Similar changes to other parameters could be made using the other input buttons 80–89 on the adapter 70. For example, the "gain" could be raised or lowered using the input keys 82 and 83, respectively. Once all of the desired changes have been made, the switches 176 and 276 could be moved to the "Run" mode, to allow the amplifier 20 to control the valve 40 using the newly programmed parameters 22. The power supply signal fed to the amplifier 20 would then return to its previous level (e.g. 12 or 24 volts), and the control circuitry 24 in the amplifier 20 could detect this level and interpret future signals on its command signal input pin as command signals from the process controller 10. In addition, the command signal input pin 5 on the amplifier 20 would be directly re-connected to the command signal of the process controller 10 (via switch 176) and disconnected from the microcontroller 74. If desired, the adapter 70 can be removed, and the amplifier 20 reconnected directly to the cable 60 to return to normal operation using the newly programmed parameters 22, such as shown in FIG. 2.

Figure 6:
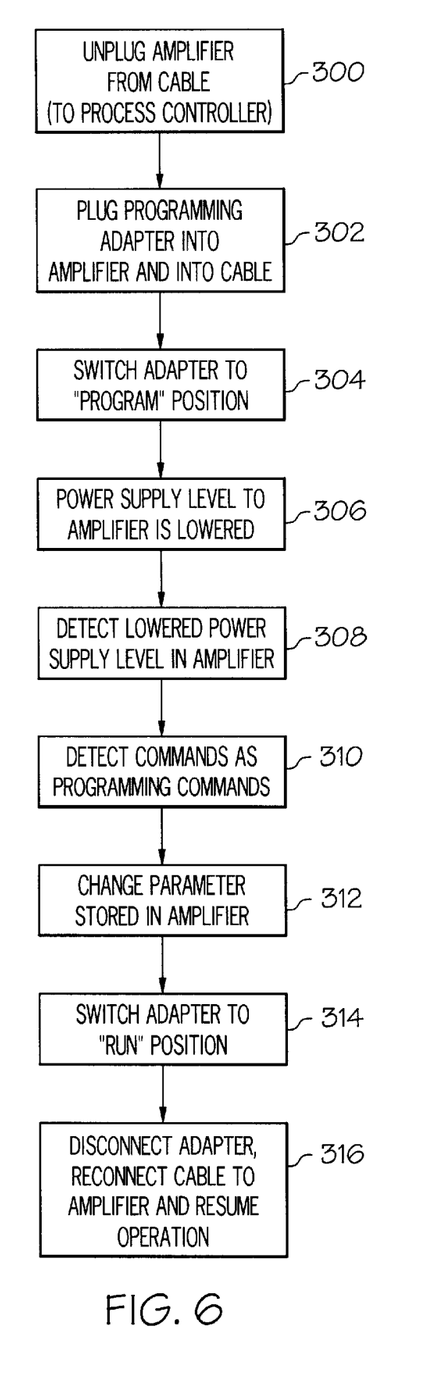
FIG. 6 is a flow chart illustrating a possible method of programming an amplifier according to the present invention, such as by using the programming adapter system illustrated in FIGS. 3–5.

FIG. 6 is a flow chart illustrating one preferred example method of programming an amplifier according to the present invention, such as by using the exemplary adapter and amplifier of FIGS. 2–5. According to this example of the inventive method, at step 300, the amplifier 20 is disconnected from the cable 60 which connects it to the process controller 10. Then, at step 302, the programming adapter 70 of the present invention is plugged into the amplifier 20, using one connection, and to the cable 60, using another connection. A switch 76 on the adapter is then moved to the "Program" position, at step 304, and the power supplied to the amplifier 20 is lowered, at step 306. (Preferably, the lowering of the power supply is caused by the movement of the switch, as described above.)

Once the power supply is lowered, the decrease is detected in the amplifier 20, at step 308, such as through control circuitry 24 or a programmable controller in the amplifier, for example. Then, step 310 can be executed, and future commands fed to the command signal input pin 5 of the amplifier 20 can be detected as programming commands, rather than command signals. The command that is received can be compared to a list of commands stored in memory in the amplifier 20. For example, a command instructing the amplifier 20 to download a particular parameter 22 can be sent to the amplifier through its command signal input pin 5. In response, the amplifier 20 can output the desired parameter 22 through its command signal input pin 5. The adapter 70 can receive this parameter 22, display it on the display 78, change it as indicated by the inputs 80–89 provided by the user, and send it back to the amplifier 20 for storage in the amplifier memory. These steps are indicated at block 312 of FIG. 6.

Once all changes are completed, the user can move the adapter switch 76 to "Run", as shown at block 314. This will cause an increase in the power supply, which is detected by the control circuitry 24 in the amplifier 20. The amplifier 20 will then interpret future signals on its command signal input pin 5 as amplifier command signals, such as voltage commands from a process controller 10, or other controller, such as a joystick for example. The amplifier 20 will then be able to control the valve 40 according to these command signals, by converting them from to the appropriate current control signal for the valve, using the parameters 22 and as is known in the art.

Then, as shown at block 316, the adapter 70 can be disconnected from the cable 60 and the amplifier 20, and the amplifier can be directly connected to the cable to resume normal operation. The adapter 70 can then be transported to other amplifiers for programming these other amplifiers. Because the programming signals are transmitted over the command signal input pin 5 of the amplifier 20, it need not include a separate connection or interface for programming. A separate connection can increase the cost of the amplifier 20 and compromise its seal. Moreover, because the programming adapter 70 includes the programming apparatus, the amplifier 20 need not include such an apparatus. In addition, the amplifier need not have special circuitry to interpret commands from a programming apparatus because communication circuitry can be provided in the adapter. In addition, because the adapter 70 can perform the programming, an expensive PC is not required.

Figure 7:
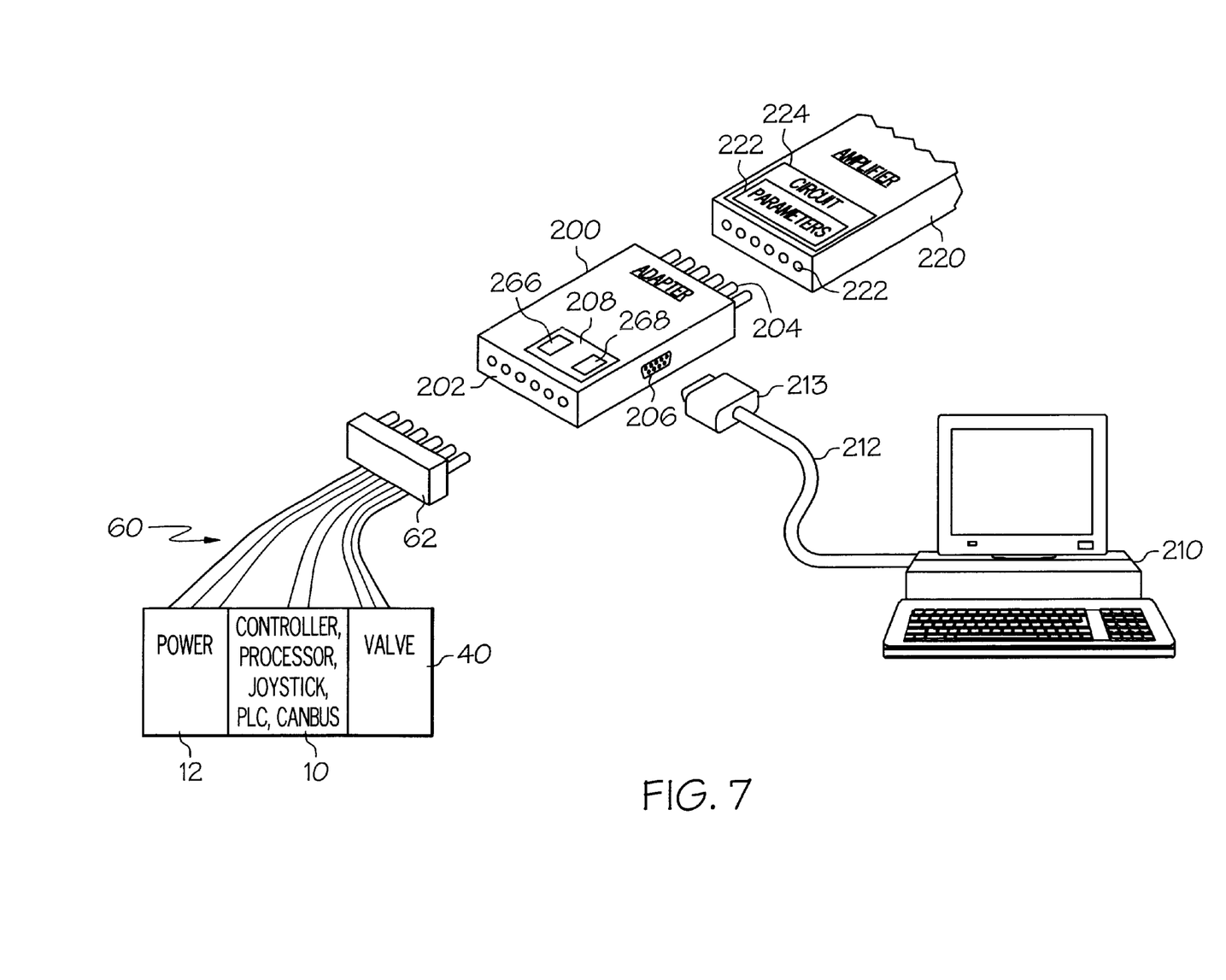
FIG. 7 illustrates a second embodiment of the adapter of the present invention, in which the adapter has three interfaces, a first interface for a valve amplifier, a second interface for a control cable (which includes connections to a valve, power supply, and process controller), and a third interface for a personal computer for programming the valve amplifier.

FIG. 7 illustrates another embodiment of the present invention. In this embodiment, the adapter 200 has three connectors 202, 204, and 206. The connector 202 mates with the male connector 62 which terminates the cable 60. As discussed above, the cable 60 includes conductors to the power supply 12, the controller 10, and the valve 40. As noted above with respect to the first embodiment, controller 10 could comprise any number of command signal generators capable of generating a command signal, such as a process controller, a joystick, a potentiometer a programmable logic controller (PLC), a microprocessor, a central processing unit (CPU), or a microcontroller. Also, it should be understood that while the conductors to the devices 10, 12, and 40 are preferably housed within a single cable 60 for efficiency, the conductors could be separated if desired. Moreover, it is contemplated that the communication system used to transmit the command signal from the controller (i.e., command signal generator) 10, could be based upon a Controller Area Network (CAN) serial communications network protocol, or could utilize a wireless signal.

In the exemplary embodiment of FIG. 7, the connector 204 of the adapter 200 connects to the female connector 222 of the valve amplifier 220. Finally, connector 206 allows the adapter 200 to connect to a computer 210, or other programming apparatus. Preferably, a portable personal computer 210 is utilized and the connection between the adapter 200 and the computer is via a serial connection 212, such as an RS232 connection for example.

In the embodiment of FIG. 7, when the adapter 200 is connected to the amplifier 220 and the cable 60, the amplitude of the power signal from the power source 12 is lowered by a voltage reduction circuit 266. The voltage reduction circuitry 266 can be similar to the voltage reduction circuitry 66 of the adapter embodiment shown in FIGS. 3–5.

In addition, connecting the adapter 200 automatically disconnects the controller 10 from the amplifier 220, and, automatically connects a communication circuit 268 to the command signal input pin of the amplifier 224. The communication circuitry 268 should be adapted to allow the computer 210 to communicate with the control circuitry 224 in the amplifier 220. As an example, communication circuitry 268 could include a circuit which can convert RS-232 signals, which can be provided by a computer, to "complimentary metal oxide semiconductor" (CMOS) levels, which can be understood and utilized by many digital controllers and digital devices. For example, communication circuitry 268 could include the MAX232E integrated circuit, manufactured by Maxim Integrated Products. The circuits 266 and 268 can be mounted on a circuit board 208.

As an alternative to the automatic connection of the voltage reduction circuitry 266 and the communication circuitry 268 upon connection of the adapter 200, the adapter 200 might preferably include a switch which is movable between a "Run" position and a "Program" position. As in the embodiment of FIGS. 3–5, the switch and circuitry could be configured such that, when the switch is in the "Run" position, the valve amplifier 220 could be directly connected to the power supply 12, the controller 10, and the valve 40 through the cable 60, as it would in normal operation when the adapter 200 is not being used. However, when the switch is moved to the "Program" position, the power supply 12 could then be connected to power reduction circuit 266, and the controller 10 could be disconnected from the amplifier 220. In addition, when the switch is in the "Program" position, the computer 210 could be connected to the command signal input pin of the amplifier 220 through the communication circuit 268. The use of such a switch allows the amplifier 220 to operate either in a normal mode or in a programming mode when the adapter 200 is connected, allowing for testing of the amplifier 220 even while the adapter 200 is connected.

Figure 8:
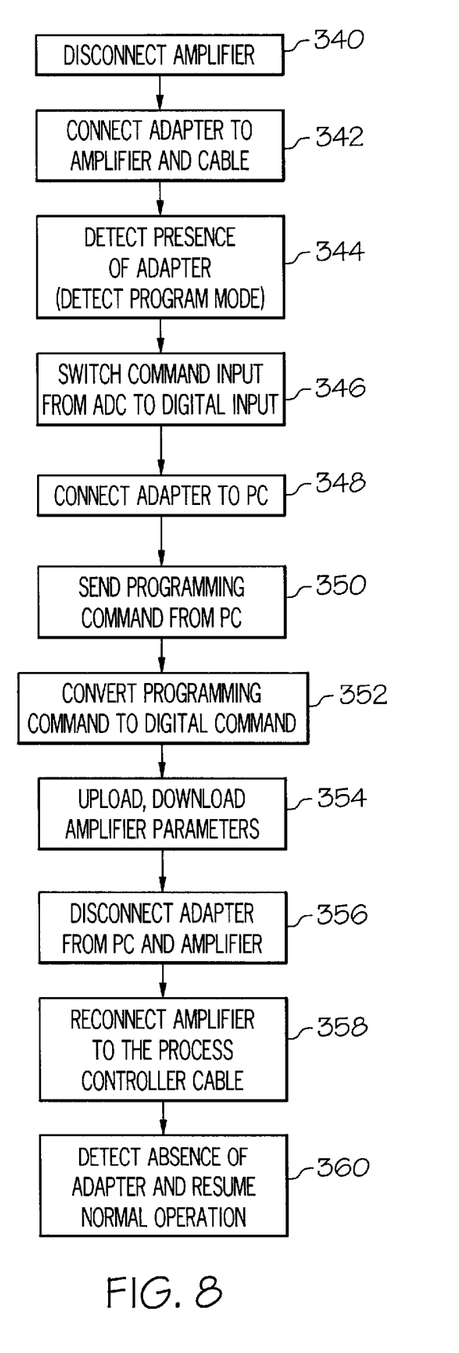
FIG. 8 is a flow diagram illustrating one possible method of programming an amplifier according to the present invention, such as by using the adapter system illustrated in FIG. 7.

FIG. 8 is a flow chart illustrating one possible method of programming an amplifier according to the present invention, such as by using the system of FIG. 7. According to this example, at step 340, the amplifier 220 can be disconnected from the cable 60, such as by removing connector 62 from connector 222. Then, at step 342, the adapter 200 can be connected to the amplifier 220 and the cable 60, such as by mating connector 62 with connector 202, and by mating connector 204 with connector 222.

Then, once the adapter 200 is connected, its presence is detected by the amplifier at step 344. As noted above, this could be achieved by moving a switch to the "Program" position which causes the power supply to be lowered by the circuit 266, and the lowered power signal to be detected by the circuit 224 in the amplifier 220. Alternatively, the connection of the adapter 200 could automatically connect the voltage lowering circuitry 266, without the need for a switch. Accordingly, the reduced power supply signal serves as a type of programming mode signal to the amplifier 222, instructing it to prepare to be programmed. It is contemplated that other methods and signals could be utilized to instruct the amplifier 220 to switch to "Program" mode.

Once the programming mode is detected in the amplifier 220 at step 344, it can prepare to receive programming instructions (i.e., programming commands) from the computer 210. This could be achieved by physically switching the command signal input pin on the amplifier 220 to a separate circuit for processing of programming instructions, as shown at block 346; such a switching might be necessary, for example, if the amplifier 220 included one circuit for processing command signals (i.e., converting command signals to control signals), and a separate circuit for processing programming instructions. Alternatively, if the amplifier 220 includes a programmable control circuit 224, it could be programmed to interpret the commands received at the command signal input as programming commands whenever the programming mode is detected; when the programming mode is no longer detected, the control circuit 224 would return to "normal" operation and interpret the commands received at the command signal input as command signals to be converted to control signals for control of the valve.

At step 348, the computer 210 is connected to the adapter 200, such as by engaging connector 206 with connector 213. Software programmed on the computer 210 can then be utilized for programming the amplifier 220. For example, a programming command can be sent from the computer 210 to the amplifier 220, as shown at step 350. Then, if necessary, the programming command can be converted to a digital command which can be understood by the control circuit 224 of the amplifier 220. As discussed above, a communication circuit 268, such as a MAX232 chip could be utilized for this purpose. This conversion step is shown at block 352 of FIG. 8.

Then, at step 354, the programming of the amplifier 220 can be conducted, in a conventional manner. For example, the stored parameters 222 of the amplifier 220 can be downloaded to the PC 210 through the serial link 212 and displayed on the PC, and new parameters can be uploaded from the PC 210 to the amplifier. The control circuit 224 on the amplifier 220 could control the sending and receiving of parameters from the amplifier 220.

Once programming is complete, the adapter 200 can be disconnected from the amplifier 220 and from the cable 60. This is shown at step 356. Then, the amplifier 220 can be directly connected to the cable 60, as shown at step 358. When this occurs, the amplitude of the power signal fed from the power source 12 to the amplifier 220 will be at its normal level, because the voltage reduction circuit 266 on the adapter 200 will no longer be connected. Accordingly, the control circuit 224 on the amplifier 220 will detect the absence of the adapter (ie, the "normal" operation mode), and resume control of the valve 40, such as by converting voltage command signals from the controller 10 to current control signals to be fed to the valve 40, the conversion taking place in accordance with the newly programmed parameters 222. This step is shown at block 360 of FIG. 8.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, methods, systems, configurations, and potential applications have been described, it should be understood that many variations and alternatives could be utilized without departing from the scope of the invention. For example, it should be understood that the invention can be used in a variety of applications requiring periodic tuning or programming of a programmable or adjustable device, and should not be limited to applications involving valve amplifiers. Moreover, although a variety of potential circuit configurations and components have been described, it should be understood that a number of other configurations and components could be utilized without departing from the scope of the invention.

For example, it is contemplated that the programming commands could be sent to the amplifier using other pins rather than the command signal input pin, so long as a separate connector or opening does not need to be provided on the amplifier; pins already provided on the amplifier connector could be utilized or added within this connector. Alternatively, a wireless connection between the programming apparatus and the amplifier programming circuitry could be utilized.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. An adapter for programming parameters within a valve amplifier, comprising:
   a first connector configured to connect to a mating connector having conductors connecting to a valve, a valve controller, and a power supply;
   a second connector configured to connect to a valve amplifier;
   a programming circuit adapted to generate and send modified parameters to the valve amplifier;
   an input device adapted to provide inputs to the programming circuit; and
   a display in communication with the programming circuit and adapted to display data from the programming circuit.

2. The adapter as recited in claim 1, further comprising:
   a switch movable from a program position to a run position, wherein the switch connects the programming circuit to a command signal input on the valve amplifier when the switch is in the program position, and alternatively connects a valve controller to the command signal input on the valve amplifier when the switch is in the run position.

3. The adapter as recited in claim 2, further comprising:
   a power reduction circuit adapted to reduce the amplitude of a power signal provided from a power supply to the adapter through the first connector, and arranged an configured to provide the reduced power signal to the valve amplifier through the second connector, wherein the switch is further adapted to connect the valve amplifier to the power supply when the switch is in the run position, and to connect the valve amplifier to the power reduction circuit when in the program position.

4. The adapter as recited in claim 1, further comprising:

a programming mode signal generating circuit adapted to provide a programming mode signal to the valve amplifier through the second connector.

5. The adapter as recited in claim 4, wherein the programming mode signal generating circuit comprises:

a power reduction circuit adapted to reduce the amplitude of a power signal provided from a power supply to the adapter through the first connector, and to provide the reduced power signal to the valve amplifier through the second connector, wherein the programming mode signal comprises the reduced power signal.

6. A method of programming an adjustable device having a command signal input adapted to receive a command signal from a controller, the method comprising the steps of:

providing a command signal from a controller to a command signal input of an adjustable device;

disconnecting the command signal from the command signal input;

detecting a programming mode;

connecting a programming apparatus to the command signal input;

transmitting a programming command from the programming apparatus to the command signal input;

after detecting the programming mode and transmitting the programming command, storing data in the adjustable device.

7. The method as recited in claim 6, wherein the detecting step comprises:

reducing a power signal supplied to the adjustable device; and detecting the reduced power signal.

8. The method as recited in claim 6, wherein the adjustable device comprises a valve amplifier.

9. The method as recited in claim 6, wherein the programming apparatus comprises a computer.

10. The method as recited in claim 6, further comprising:

converting the programming command from a first format to a second format.

11. The method as recited in claim 6, further comprising:

re-connecting the command signal to the command signal input of the adjustable device;

using the stored data, converting the command signal to a control signal for control of a valve, wherein the command signal comprises a voltage signal and the control signal comprises a current signal.

12. An adapter for programming an adjustable device, the adapter comprising:

a first connector adapted to be connected to a controller, wherein the controller is adapted to provide command signals to a command signal input on an adjustable device;

a second connector adapted to be connected to the command signal input of the adjustable device;

a communication circuit adapted to communicate a programming command from a programming apparatus to the adjustable device; and a switch adapted to disconnect the command signal input from the controller and to connect the command signal input to the communication circuit.

13. The adapter as recited in claim 12, wherein the programming command is a digital signal, and wherein the command signal is an analog signal.

14. The adapter as recited in claim 12, wherein the second connector is further adapted to connect to a power supply, and wherein the adapter further comprises:

a power reduction circuit adapted to reduce the amplitude of a power signal from the power supply and provide the reduced power signal to the adjustable device.

15. The adapter as recited in claim 12, further comprising:

a microcontroller adapted to generate the programming command.

16. The adapter as recited in claim 15, further comprising:

input buttons; and a display device.

17. The adapter as recited in claim 12, further comprising:

a third connector adapted to connect to the programming apparatus.

18. The adapter as recited in claim 17, wherein the third connector comprises a serial port.

* * * * *